(12) United States Patent
Kuo

(10) Patent No.: US 8,840,280 B2
(45) Date of Patent: Sep. 23, 2014

(54) NON-IMAGING OPTICAL LENS AND LIGHTING DEVICE HAVING THE SAME

(71) Applicant: B&M Optics Co., Ltd., Taichung (TW)

(72) Inventor: Hung-Pin Kuo, Taichung (TW)

(73) Assignee: B&M Optics Co., Ltd., Taichung (TW)

( * ) Notice: Subject to any disclaimer, the term of this patent is extended or adjusted under 35 U.S.C. 154(b) by 0 days.

(21) Appl. No.: 13/773,001

(22) Filed: Feb. 21, 2013

(65) Prior Publication Data
US 2013/0215619 A1 Aug. 22, 2013

(30) Foreign Application Priority Data
Feb. 22, 2012 (TW) .............................. 101105874 A

(51) Int. Cl.
| | |
|---|---|
| F21V 3/00 | (2006.01) |
| F21V 5/00 | (2006.01) |
| F21S 8/00 | (2006.01) |
| G02B 3/00 | (2006.01) |
| G02B 19/00 | (2006.01) |
| F21V 5/04 | (2006.01) |

(52) U.S. Cl.
CPC .............. *G02B 3/00* (2013.01); *G02B 19/0028* (2013.01); *F21V 5/04* (2013.01); *G02B 19/0061* (2013.01)
USPC .................. 362/311.06; 362/249.02; 362/268

(58) Field of Classification Search
USPC .......................................... 362/268, 335, 455
See application file for complete search history.

(56) References Cited

U.S. PATENT DOCUMENTS

| | | | | |
|---|---|---|---|---|
| 5,924,788 | A | * | 7/1999 | Parkyn, Jr. ..................... 362/329 |
| 6,019,493 | A | * | 2/2000 | Kuo et al. ...................... 362/335 |
| 8,047,699 | B2 | * | 11/2011 | Cheng et al. ................... 362/619 |
| 2012/0120646 | A1 | * | 5/2012 | Jiang et al. ..................... 362/230 |

FOREIGN PATENT DOCUMENTS

| | | |
|---|---|---|
| TW | 201113555 | 4/2011 |
| TW | M41133 | 9/2012 |

* cited by examiner

*Primary Examiner* — Donald Raleigh
(74) *Attorney, Agent, or Firm* — Muncy, Geissler, Olds & Lowe, P.C.

(57) ABSTRACT

The present invention relates to a non-imaging optical lens and a light-emitting module having the same. The lens includes a concave region having a continuous curved optical surface formed by a plurality of facets spliced together. The continuous curved optical surface faces the light-emitting device. The curved surface consists of an array in at least three rows of the facets and at least three columns of the facets.

7 Claims, 6 Drawing Sheets

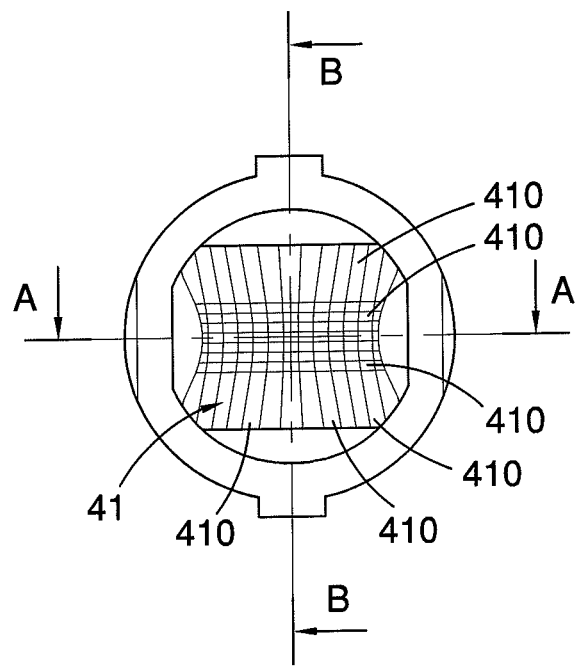
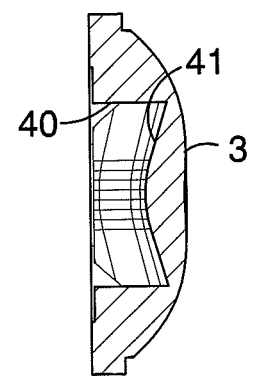
FIG. 3
FIG. 5
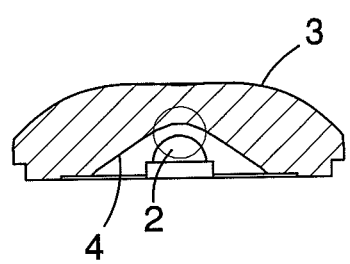
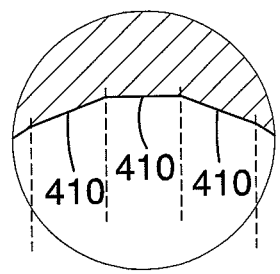
FIG. 4
FIG. 4A

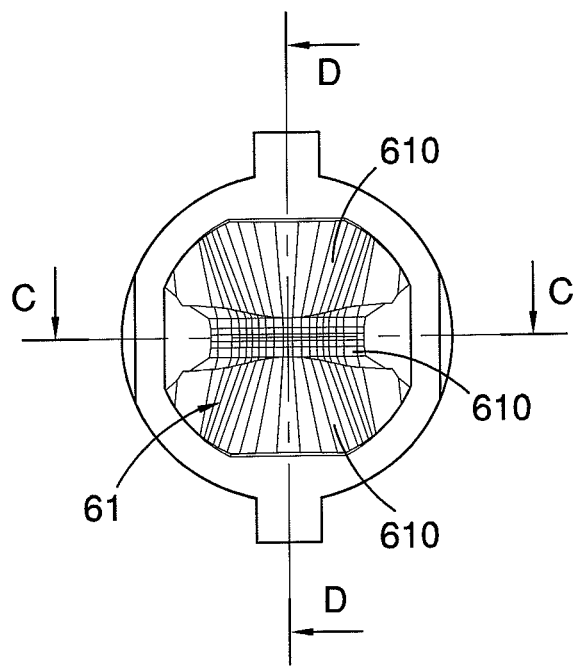
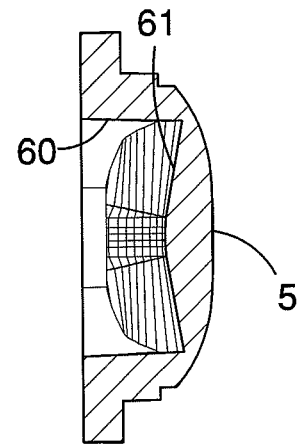
FIG. 8  FIG. 10
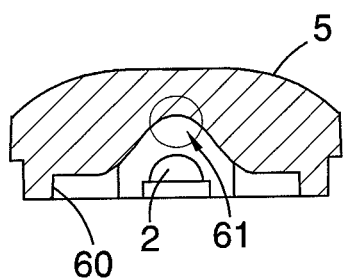
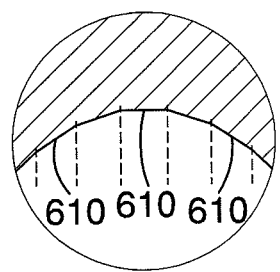
FIG. 9  FIG. 9A

NON-IMAGING OPTICAL LENS AND LIGHTING DEVICE HAVING THE SAME

BACKGROUND OF INVENTION

1. Field of Invention

The invention relates to a non-imaging optical lens and a light-emitting module having the lens which achieves effects of uniform light.

2. Related Prior Art

A general optical lens, which is particularly applicable for a light emitting diode, is used as a secondary optical lens for converging or diverging the light beam. However, it might incur facula.

As disclosed in Taiwan Publication Patent No. M411533, a LED lens has advantages of diffusion light and uniform light. The aforementioned LED lens has a concave condensing part 11 at the bottom of the lens and a concave diffusing part at the center of the top of the lens, so as to diffusing the light. Besides, the lens further has a circular inclined wide-angle part at a peripheral of the top of the lens. However, it has limited uniform light distribution.

In addition, Taiwan Publication Patent No. 201113555 relates to a non-imaging condensing lens, which comprises a plurality of annular protruding prisms to uniformly concentrate light (such as sunlight) on a solar panel for collection. Nevertheless, the lens is typically applicable for the parallel light beam.

SUMMARY OF INVENTION

The present invention discloses a lens with effects of uniform light and a light-emitting module having the lens.

Specifically, the non-imaging optical lens comprises a concave region, wherein the concave region has a continuous curved optical surface formed by a plurality of facets spliced together. The curved surface consists of an array in at least three rows of the facets and at least three columns of the facets. The facets in each row have slopes gradually increasing or gradually decreasing with a parabola, and the facets in each column have slopes gradually increasing or gradually decreasing with the other one parabola that is orthogonal thereto.

As mentioned above, the facets of the curved surface is formed at the concave region of the lens, which does not affect surface curvature of the lens. Therefore, the incident light would first be deranged when the light travels through the lens. More specifically, the incident light would slightly scatteringly travel through the lens after the incident light enters through the curved surface. The light would be further slightly blurred when entering through the lens. After that, the light is then refracted at the surface with wide diffusion angle, which thus achieves effects of diffusion and uniform light.

Besides, the cost of the curved surface formed by multiple facets of the present invention is less than that of a smooth curved surface of the convention lens. Compared with the smooth aspheric surface made by a precise mechanical apparatus, the curved surface formed by multiple facets of the present invention is easy to be manufactured by a general mechanical apparatus. Therefore, the lens of the present invention has greater coast advantages.

Other features, objects, aspects and advantages will be identified and described in detail below.

BRIEF DESCRIPTION OF DRAWINGS

FIG. 3 is a bottom plane view of the lens in accordance with the first embodiment of the invention;

FIG. 4 is a cross sectional view along line A-A of the lens of FIG. 3;

FIG. 4A is a partial enlarged sectional view of the lens of FIG. 4;

FIG. 5 is a cross sectional view along line B-B of the lens of FIG. 3;

FIG. 8 is a bottom plane view of the lens in accordance with the second embodiment of the invention;

FIG. 9 is a cross sectional view along line C-C of the lens of FIG. 8;

FIG. 9A is a partial enlarged sectional view of the lens of FIG. 9;

FIG. 10 is a cross sectional view along line D-D of the lens of FIG. 8;

DETAILED DESCRIPTION OF EMBODIMENTS

With reference to FIGS. 1 to 5, a non-imaging optical lens 100 is shown in accordance with a first embodiment of the present invention. The non-imaging optical lens 100 is mainly used for a secondary lens of a light-emitting device 2 (such as a LED), as shown in FIG. 4. The non-imaging optical lens 100 is covered on the light-emitting device 2, which constitute a light-emitting module with other electronic components (not shown). The lens 100 is mainly used as a secondary lens of the light-emitting device 2 for achieving effects of generating a wider diffusion angle. The multiple facets of the lens 100 can further provide additional functions of uniform light, reducing facula or avoiding generating a shape of shadow of a light source.

Figure 1:
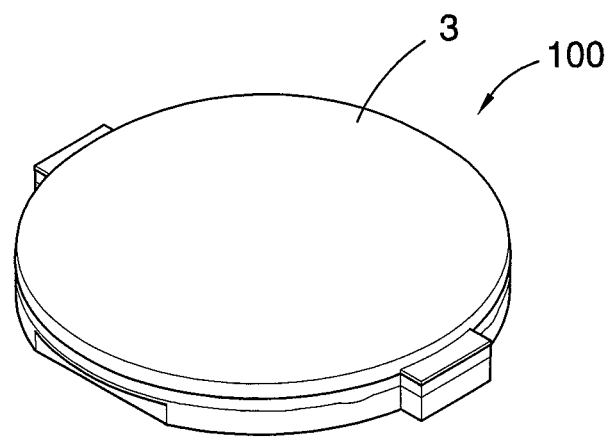
FIG. 1 is a perspective view of a non-imaging optical lens in accordance with a first embodiment of the invention.

As shown in FIG. 1, the lens 100 has a protruded region 3 at a top surface thereof, and the lens 100 has a concave region 4 at a bottom surface thereof. The protruded region 3 is a prominent optical surface that projects outwards. The concave region 4 is an optical surface that curves inwards. The concave region 4 includes an inner wall 40 and a curved surface 41 that is formed by a plurality of facets 410. That is, the facets 410 are spliced together to form the continuous curved surface 41. The curved surface 41 consists of an array in at least three rows of the facets 410 and at least three columns of the facets 410, which would provide sufficient effect of uniform light. Preferably, as shown in FIG. 3, the curved surface 41 consists of 13 rows (along a direction of line A-A) and 9 columns (along a direction of line B-B) of the facets 410 in different sizes, which provides better effects of uniform light.

Figure 2:
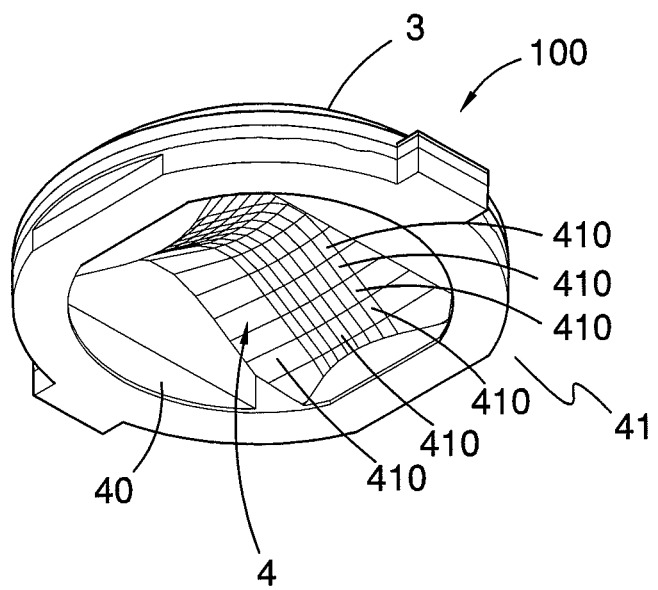
FIG. 2 is bottom perspective view of the non-imaging optical lens of FIG. 1 in accordance with the first embodiment of the invention.

As shown in FIG. 2, the curved surface 41 is in a hyperbolic paraboloid shape or a saddle-like shape. Moreover, referring to FIG. 4A showing an enlarged cross sectional view of the lens, the facets 410 in each row of the curved surface 41 have slopes gradually increasing or gradually decreasing with the curve of the parabola, and referring to FIG. 3 or FIG. 5, the facets 410 in each column of the curve surface 41 also have slopes gradually increasing or gradually decreasing with the curve of another orthogonal parabola.

As mentioned above, the facets 410 of the curved surface 41 is formed at the concave region 4 of the lens 100, which does not affect surface curvature of the lens. Therefore, the incident light would first be deranged when the light travels through the lens 100. More specifically, the incident light would slightly scatteringly travel through the lens 100 after the incident light enters through the curved surface 41. This shows that the light might be overlapped when travelling through the lens 100. After that, the light is then refracted at the protruded region 3 with wide diffusion angle, which thus achieves effects of diffusion and uniform light.

With reference to FIGS. 6 to 10, a non-imaging optical lens 200 is shown in accordance with a second embodiment of the present invention. The lens 200 is mainly used for a secondary lens of a light-emitting device 2 as shown in FIG. 9. The non-imaging optical lens 200 is covered on the light-emitting device 2, which constitute a light-emitting module with other electronic components (not shown). The lens 200 is mainly used as a secondary lens of the light-emitting device 2 for achieving effects of generating a wider diffusion angle. The multiple facets of the lens 200 can further provide additional functions of uniform light, reducing facula or avoiding generating a shape of shadow of a light source.

Figure 6:
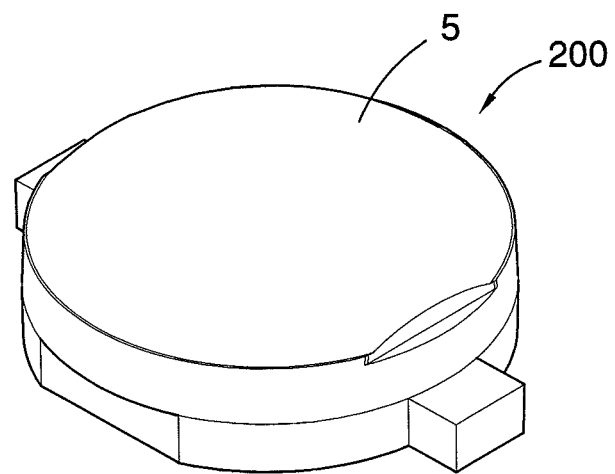
FIG. 6 is a perspective view of a non-imaging optical lens in accordance with a second embodiment of the invention.
Figure 7:
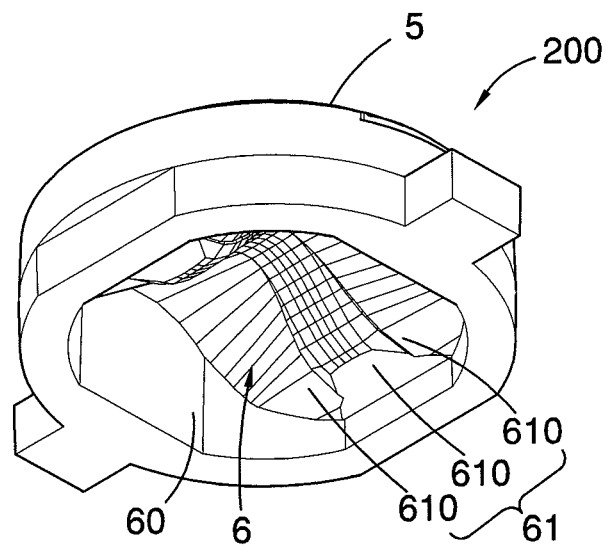
FIG. 7 is bottom perspective view of the non-imaging optical lens of FIG. 6 in accordance with the second embodiment of the invention.

As shown in FIG. 6 and FIG. 7, the lens 200 has a protruded region 5 at a top surface thereof, and the lens 200 has a concave region 6 at a bottom surface thereof. The protruded region 5 is a prominent optical surface that projects outwards. The concave region 6 is an optical surface that curves inwards. The concave region 6 includes an inner wall 60 and a curved surface 61 that is formed by a plurality of facets 610. That is, the facets 610 are spliced together to form the continuous curved surface 41. Similarly, the curved surface 61 consists of at least three rows of the facets 610 and at least three columns of the facets 610, which would provide sufficient effects of uniform light. Preferably, as shown in FIG. 8, the curved surface 61 consists of 20 rows (along a direction of line C-C) and 9 columns (along a direction of line D-D) of the facets 610 in different sizes, which provides better effects of uniform light.

As shown in FIG. 7, the curved surface 61 is in a quasi hyperbolic paraboloid shape or a saddle-like shape. The above-mentioned quasi hyperbolic paraboloid shape is a shape including a hyperbolic paraboloid (as shown in FIG. 2) and an elongated trench in the center area of the hyperbolic paraboloid. By any means, the curved surface 61 includes surfaces of the elongated trench and the other regions adjacent to the elongated trench, which are formed a saddle-like surface. Besides, referring to FIG. 9A showing an enlarged cross sectional view of the lens, the facets 610 in each row of the curved surface 61 have slopes gradually increasing or gradually decreasing with the curve of the parabola, and referring to FIG. 8 or FIG. 10, the facets 610 in each column of the curve surface 61 also have slopes gradually increasing or gradually decreasing with the curve of another orthogonal parabola.

As mentioned above, the facets 610 of the curved surface 61 is formed at the concave region 6 of the lens 200, which does not affect surface curvature of the lens. Therefore, the incident light would first be deranged at the first time when the light travels through the lens 200. More specifically, the incident light would slightly scatteringly travel through the lens 200 after the incident light enters through the curved surface 61. The light would be further slightly blurred when entering through the lens 200. After that, the light is then refracted at the protruded region 5 with wide diffusion angle, which thus achieves effects of diffusion and uniform light.

Figure 11:
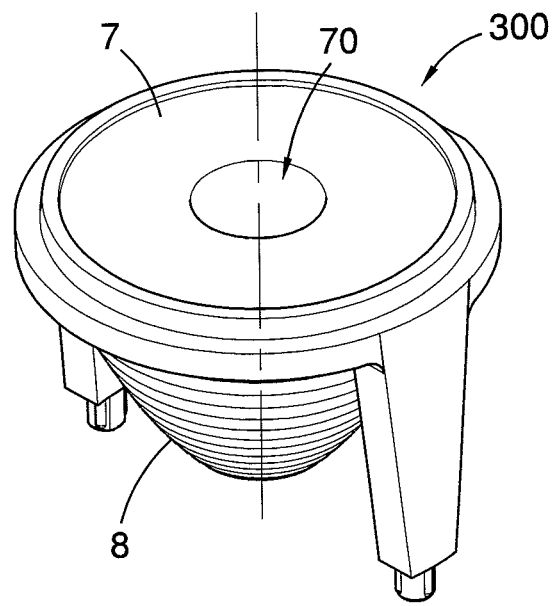
FIG. 11 is a perspective view of a non-imaging optical lens in accordance with a third embodiment of the invention.
Figure 14:
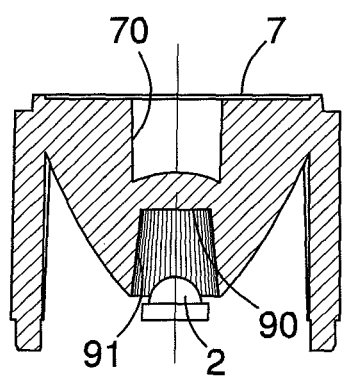
FIG. 14 is a cross sectional view along line E-E of the lens of FIG. 13.
Figure 15:
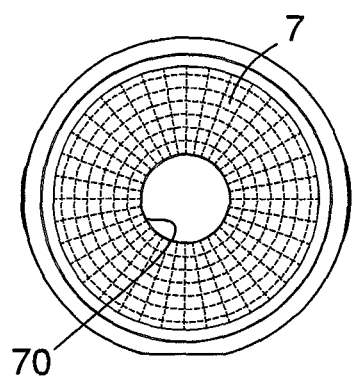
FIG. 15 is a top plane view of the lens in accordance with the third embodiment of the invention.

With reference to FIGS. 11 and 15, a non-imaging optical lens 300 is shown in accordance with a third embodiment of the present invention. The lens 300 is mainly used for a secondary lens of a light-emitting device 2 as shown in FIG. 14. The non-imaging optical lens 300 is covered on the light-emitting device 2, which constitute a light-emitting module with other electronic components (not shown). The lens 300 is a total internal reflection lens, which enables the light from the light-emitting device 2 to be condensed by passing through the secondary lens. The multiple facets of the lens 300 can further provide additional functions of uniform light, reducing facula or avoiding generating a shape of shadow of a light source.

Figure 12:
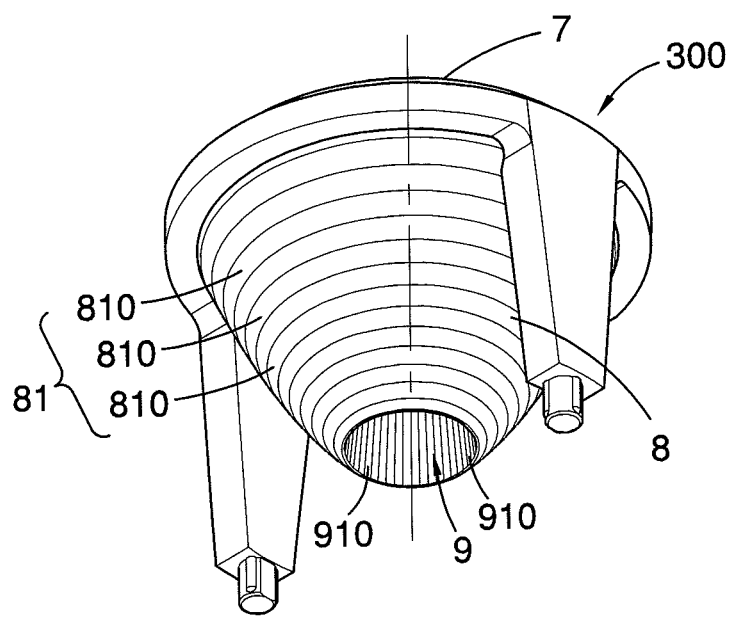
FIG. 12 is bottom perspective view of the non-imaging optical lens of FIG. 6 in accordance with the third embodiment of the invention.

As shown in FIG. 11 and FIG. 12, the lens 300 has an opening 70 at a top surface 7 thereof, and the lens 300 has a recess 9 at a bottom surface thereof for accommodating the light-emitting device 2. The opening 70 faces up and the recess 9 faces down (as shown in FIG. 14). The lens 300 has an outer lateral surface, which is a conical optical surface 8. The conical optical surface 8 includes a curved surface 81 that is formed by a plurality of conical facets 810. That is, the conical facets 810 are spliced together to form the continuous curved surface 81 with functions of uniform light. The conical optical facets 810 of the conical optical surface 8 encircle an axis that is the optical axis of the lens 300 (as shown in the dash line), which shows that the conical optical facets 810 are arranged on the optical axis of the lens 300.

Figure 13:
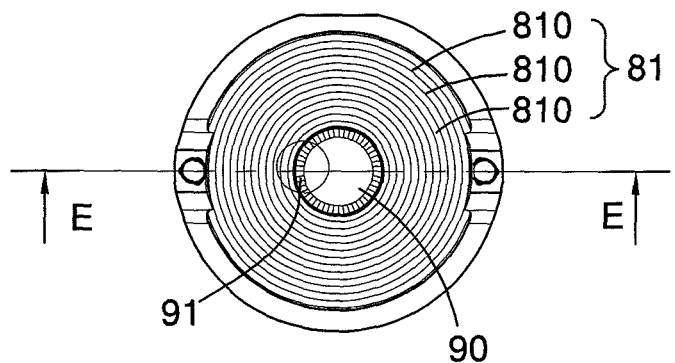
FIG. 13 is a bottom plane view of the lens in accordance with the third embodiment of the invention.
Figure 13A:
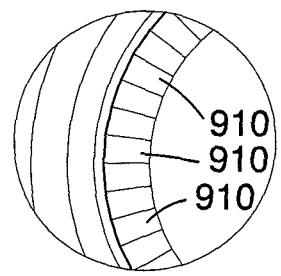
FIG. 13A is a partial enlarged sectional view of the lens of FIG. 13.

Referring to FIG. 14 showing a cross sectional view of the lens, the recess 9 of the lens 300 has a circular top surface 90 and a cylinder-like surface 91 that is formed by a plurality of elongated planes 910 (as shown in FIG. 13A). That is, the elongated planes 910 are spliced and annularly arranged together to form the continuous cylinder-like surface 91. There is a common line between each two elongated planes 910 of the cylinder-like surface 91, and each common line is substantially parallel to the optical axis of the lens 300 (as shown in the dash line).

As such, referring to FIG. 15 showing a top view of the lens, visual effects of a concentric circle consisting of several grid patterns is generated duce to interlacement of the transverse arrangement of the curved surface 81 and the upright arrangement of the cylinder-like surface 91 of the lens 300. In other words, the lens 300 having such interlacement of the curved surface 81 and the cylinder-like surface 91 would provide greater effects of uniform light.

Specifically, the facets 810 and the elongated planes 910 are respectively at the outer surface and the inner surface of the lens 300, which does not affect surface curvature of the lens. Therefore, the incident light would first be refracted at the cylinder-like surface 91 and then scatteringly enter the lens 300. Then, part of the light at peripheral would be deranged and totally internally reflected at the curved surface 81. After that, the light travels toward the top surface 7 of the lens 300. Accordingly, the lens would provide light-concentration effects and greater uniform light effects due to the special lens structure of the interlacement of the transverse arrangement of the curved surface 81 and the upright arrangement of the cylinder-like surface 91.

It will be appreciated that although a particular embodiment of the invention has been shown and described, modifications may be made. It is intended in the claims to cover such modifications which come within the spirit and scope of the invention.

The invention claimed is:

1. A non-imaging optical lens comprising:
a convex region being a light emitting surface; and
a concave region being a light incident surface, wherein the concave region has a curved optical surface formed by a plurality of flat facets spliced together,
wherein the curved surface is a spliced hyperbolic paraboloid surface.

2. The non-imaging optical lens of claim 1, wherein the curved surface consists of an array in at least three rows of facets and at least three columns of the facets.

3. The non-imaging optical lens of claim 2, wherein the facets in each row have slopes gradually increasing or gradually decreasing with the parabola, and the facets in each column have slopes gradually increasing or gradually decreasing with another orthogonal parabola.

4. A light-emitting module, comprising:
a light-emitting device; and
a non-imaging optical lens, having a concave region, wherein the concave region has a curved optical surface formed by a plurality of flat facets spliced together, and the curved optical surface faces the light-emitting device,
wherein the curved surface is a spliced hyperbolic paraboloid surface.

5. The light-emitting module of claim 4, wherein the curved surface consists of an array in at least three rows of the facets and at least three columns of the facets.

6. The non-imaging optical lens of claim 5, wherein the facets in each row have slopes gradually increasing or gradually decreasing with the parabola, and the facets in each column have slopes gradually increasing or gradually decreasing with another orthogonal parabola.

7. The non-imaging optical lens of claim 4, wherein the spliced hyperbolic paraboloid surface has a center area forming an elongated trench.

* * * * *